Patented Feb. 22, 1944

2,342,387

UNITED STATES PATENT OFFICE 2,342,387

PROCESS FOR PREPARING COATING COMPOSITIONS

Willard E. Catlin, Wilmington, Del., assignor to E. I. du Pont de Nemours & Company, Wilmington, Del., a corporation of Delaware No Drawing. Application October 24, 1939, Serial No. 301,068

3 Claims. (Cl. 260—29)

This invention relates to new compositions of matter, and more particularly to coating and impregnating compositions.

This invention has as an object the production of new and useful compositions of matter. A further object is a composition from which polyamides may be applied for coating and impregnating without the difficulties previously accompanying the application of polyamides for these purposes. Other objects will appear hereinafter.

The polyamides with which this invention is concerned are the high molecular weight or fiber-forming linear polyamides described in United States patents, 2,071,250, 2,071,253, 2,130,523 and 2,130,948. These polyamides because of their toughness, great strength, high melting point and insensitivity to water and most solvents are valuable materials for coating and impregnating compositions. However, because of their insolubility in the usual types of solvents, difficulties are encountered in applying the polyamide coating from solution. Polyamide solvents such as phenol and formic acid are unsuitable for most coating compositions because of their toxic or corrosive nature. Thus fabric coated with polyamides dissolved in acidic solvents is tendered. Application of the coating from the molten polyamide is not widely applicable and is impracticable for many purposes because the article to be coated will not withstand the high temperature of the molten polyamide. Furthermore, it is very difficult to deposit extremely thin coatings from melt.

I have found that the above mentioned difficulties are overcome through the use of a dispersion of the polyamide in a non-solvent in which the particles are present in very finely divided form, the average particle size being not larger than 4 microns. The properties of the polyamides are such that their dispersion presents unusual difficulties. The dispersions used in the practice of this invention have not and cannot be obtained by the grinding methods readily applicable to most polymeric materials. The polyamides, particularly those of intrinsic viscosity above 0.4 which are most useful for coating and impregnating, are so tough that they cannot be finely ground. Moreover, because of their fiber-forming properties the polyamides tend to form stringy fibrous masses upon precipitation unless special precautions are taken.

The method for obtaining my new and improved dispersion which is the most satisfactory and generally applicable consists in mixing with vigorous stirring a solution of the polyamide with a non-solvent for the polyamide, separating the precipitated polyamide, and then redispersing the separated precipitate in a non-solvent (preferably neutral or inert with respect to the material to be impregnated or coated) for the polyamide by vigorous mechanical dispersing means which separate the agglomerates of the particles.

In the preferred practice of my invention the polyamide is dissolved in formic or hydrochloric acid and the solution poured with vigorous agitation into a large volume of non-solvent such as methanol, ethanol, acetone, or ethyl acetate. For some of the more soluble polyamide interpolymers a mixture of formic acid and methanol is preferred as the solvent in combination with acetone as the non-solvent. The polyamide suspension is then filtered, washed and re-dispersed in one of the mentioned non-solvents by means of a colloid mill. Although it is usually desirable to remove all the acid solvent from the polymer by washing before re-dispersing it, in some cases the excess acid in the dispersion may be neutralized with alkali or ammonia. The dispersions are generally more fluid when weakly acid and tend to thicken upon addition of alkali but this effect is much more evident with some polymers than others. The addition of neutral salt has in general no adverse effect upon the stability of the dispersions.

It is to be observed that the colloid mill is not used to reduce the size of the particles by grinding. It serves rather to break up the aggregates of particles and to thoroughly disperse the finely divided particles already formed. Consequently the milling operation usually requires only a few minutes.

Another, though less preferred method, is to remove the original liquid by distillation at atmospheric or reduced pressure and then re-disperse the solid in the desired medium. Still another modification is possible when the final medium is to be or contain methanol. The polymer can be precipitated from formic acid solution by pouring into a large volume of agitated methanol. When the suspension obtained in this way is slowly distilled the formic acid is esterified and the methyl formate produced is removed as distillate. The residue from the distillation consists of a suspension of the polymer in methanol and it can then be more completely dispersed by use of the colloid mill or a ball mill. A further method of producing the finely divided polymer is to dissolve the polyamide in a mixture of liquids which contains at least one higher boiling liquid which alone is not a polyamide solvent. The liquid mixture is then separated by distillation so that the polyamide is, as in the above methods, left in a liquid consisting essentially of the non-solvent. This procedure causes the solid to separate in finaly divided form.

The following examples are illustrative of methods for practicing my invention.

*Example I*

A solution which was prepared by dissolving 20 parts of polyhexamethylene adipamide, having an intrinsic viscosity of 0.85, in 70 parts of 90% formic acid, was slowly added to 320 parts of vigorously agitated methanol. The precipitated polymer was removed by filtration, washed with methanol, and suspended in 300 parts of water. The solid was thoroughly dispersed by milling in a colloid mill. Microscopic examination revealed that the dispersed particles were 2 microns or smaller in diameter. The dispersion exhibited great stability. There was no tendency for the polymer to settle even after long standing.

Example II

A solution of 10 parts of polyhexamethylene adipamide (intrinsic viscosity 0.85) in 60 parts of 35% aqueous hydrochloric acid was poured into 240 parts of well-agitated 95% ethyl alcohol. The precipitate was filtered off, washed with ethyl alcohol, and suspended in 225 parts of water. The solid was dispersed with a colloid mill. The particles were 4 microns or smaller in diameter. A smooth adherent coat of polymer was applied to leather by covering it with the dispersion and drying.

Example III

A solution of 5 parts of polyhexamethylene sebacamide (intrinsic viscosity 0.9) in 30 parts of 90% formic acid was poured into 120 parts of well-agitated acetone. The precipitate was removed by filtration, washed with acetone and suspended in water. The solid was dispersed with the air of a colloid mill. The particles were 4 microns or smaller in diameter.

Example IV

A solution was prepared by dissolving in 40 parts of 90% formic acid 10 parts of the polymer obtainable by polymerization of epsilon-aminocaproic acid. This solution was poured with vigorous stirring into 240 parts methanol. The precipitate was filtered off, washed with methanol, and suspended in 140 parts of water. After milling in the colloid mill, most of the particles were 4 microns or smaller in diameter.

Example V

One hundred thirty-five parts of the polymer (intrinsic viscosity 1.0) obtained by the interpolymerization of 60 parts of hexamethylenediammonium adipate with 40 parts of epsilonaminocaproic acid was dissolved in 500 parts of 90% formic acid. This solution was diluted with 720 parts of methanol and then precipitated by pouring it and 2500 parts of acetone simultaneously into a well agitated mixture of 50 parts of methanol and 100 parts of acetone. The precipitate was removed by filtration, washed with acetone, and resuspended in 1000 parts of water. The dispersion, after three passes through the colloid mill, had the appearance of cream. The average diameter of the particles was less than 4 microns.

A piece of cloth which had been impregnated with this dispersion was allowed to dry and was then ironed between two pieces of damp broadcloth. The layers of cloth adhered so firmly that the center piece tore when they were pulled apart. The laminated fabric possessed the stiffness necessary for use in collars and cuffs.

One hundred thirty-five parts of this dispersion were milled in a colloid mill with one part of titanium oxide. This produced a material with the appearance of white paint.

Example VI

A 17% solution in formic acid was prepared from the massive polymer of Example V. In 60 parts of this solution was dispersed 1 part of finely divided titanium oxide. This mixture was then poured into a well agitated mixture of 96 parts of acetone and 64 parts of methanol. The precipitate was removed by filtration, washed with acetone, and suspended in 200 parts of water. The colloid mill was used to suspend the particles. The dispersion had a smooth paint-like appearance.

Portions of this dispersion were spread on pieces of glass, aluminum, iron, brass, and copper. When dry, the coatings were smooth, white, and adherent. By heating the material for a few seconds above the melting point of the polymer, the gloss of the finish was improved and the coating film became tougher and more adherent.

Example VII

Five parts of titanium oxide were dispersed in a solution containing 25 parts of the polymer, obtained by polymerizing 60 parts of hexamethylenediammonium adipate and 40 parts of hexamethylenediammonium sebacate, in 100 parts of 90% formic acid. This mixture was poured into 400 parts of well agitated methanol. The solid was removed by filtration, washed with methanol and resuspended in 250 parts of distilled water. A colloid mill was used to thoroughly disperse the solid.

Example VIII

A solution of 10 parts of the polymer of Example V in 40 parts of formic acid was diluted with 56 parts of methanol. This solution was poured into a vigorously agitated mixture of 160 parts of acetone and 80 parts of methanol. Another 80 parts of acetone was added and the mixture was allowed to stand for an hour before filtering. The solid was washed with acetone and then dispersed in 65 parts of acetone. To this dispersion was added 10 parts of amylbenzenesulfonamide and the product was stirred vigorously with a malted milk type mixer.

A small portion of this dispersion when spread out on a glass plate dried to form a transparent continuous film. A second portion (70 parts) of the dispersion was pigmented by the addition of 0.2 part of carbon black and portions of this composition were spread on fabric and treated with steam to aid in the production of a uniform coat. After 5 coats of the dispersion had been applied to a piece of fabric, it was soft and pliable and was leather-like in appearance and feel.

Example IX

A solution of 10 parts of polyhexamethylene adipamide in 50 parts of 90% formic acid was poured into 240 parts of agitated methanol. The very fine dispersion obtained in this way was diluted to twice its original volume with acetone and slowly distilled. The methyl formate, formed by esterification of the formic acid distilled over with some acetone. More acetone was added during the distillation in order to keep the volume of dispersion constant. The distillation was continued until the distillate no longer contained any methyl formate. The residue consisted of a dispersion of polyhexamethylene adipamide in acetone containing a small amount of methanol. It was milled in a ball mill for a short time in order to break up the small amount of flocculation which occurred during the distillation. The particles were smaller than 4 microns.

Instead of the polyamides mentioned above which are obtainable from bifunctional polyamide-forming reactants as essentially sole reactants, I may use the linear polymers obtained by including with the polyamide-forming reactants used to prepare the polyamide, other bifunctional reactants, e. g. glycols or hydroxy acids. As examples of such modified polyamides may be mentioned those derived from diamines, dibasic acids and glycols; those derived from amino acids, dibasic acids and glycols; and those derived from amino acids and hydroxy acids. Although these products contain ester linkages, they are referred to herein as polyamides, since they contain a plurality of amide linkages and retain many of the desirable properties of the simple polyamides. All the polymers used in this invention contain amide groups as an integral part of the main chain of atoms in the polymers.

The polyamide dispersion described herein are unusual in that they are stable without a dispersing agent. However, a dispersing agent may be used to reduce the viscosity.

The solvents used in the present process are those liquids known to dissolve polymers containing recurring amide linkages. These include, in addition to formic acid and hydrochloric acid, sulfuric acid, pyruvic acid, acetic acid, phenol, o-cresol, m-cresol, p-cresol, xylenol, p-butylphenol, thymol, diphenylolpropane, o-hydroxydiphenyl, and in some cases benzyl alcohol, butyl alcohol, ethoxyethanol, dimethylformamide, formamide, ethylene chlorhydrin, methallyl alcohol, methylethynylcarbinol, mixtures of methanol with chlorinated solvents, combinations of these solvents, and mixtures of these solvents with other compounds. The acids and phenols are quite widely applicable to polyamides in general but the use of the other solvents is usually restricted to the more soluble polyamide interpolymers and to the polyamide-polyesters.

As compounds which can be used as the nonsolvent for precipitation of the polymer are included most liquids in which the polymer is only sparingly soluble. Since the solubility behavior of the linear polymers containing recurring amide groups varies, the liquid used for the precipitation will depend upon the polymer to be dispersed. A liquid which can be used as the solvent for one polymer may be used for the precipitation of another. For example, methanol, which is one of the preferred non-solvents for use in dispersing polyhexamethylene adipamide, is used mixed with formic acid as the solvent for the polymer obtainable from hexamethylenediammonium adipate and epsilon-aminocaproic acid. These compounds which are most generally useful as nonsolvents include methanol, ethanol, higher alcohols, acetone, higher ketones, ethyl acetate and water. The non-solvent used must precipitate the polymer from solution and must be at least partially miscible with the particular solvent being used.

Although many polyers are prepared in very finely divided form suitable for dispersing by precipitation at about 25° C., the preferred temperature for each combination of polymer, solvent and non-solvent must be determined by experiment. The preferred temperature is dependent on the melting point of the polymer, the melting and boiling points of the solvent and non-solvent, and the variation in solubility of the polymer with change in temperature.

As media in which to disperse the finely divided polymer may be used any liquid which does not appreciably dissolve or substantially alter the polymer. These include water, methanol, ethanol, higher alcohols, acetone, methyl ethyl ketone, ethyl acetate, ethyl butyrate, amyl acetate, ethyl ether, isopropyl ether, dioxan, benzene, toluene, petroleum hydrocarbons, dichloroethane, chloroform, carbon tetrachloride, dichloroethylene, trichloroethylene, tetrachloroethylene, dichloroethane, trichloroethane, tetrachloroethane, pentachloroethane, mixtures of these liquids, and solutions of other materials in these liquids. For most uses it will be desirable to select a volatile dispersing medium.

For many purposes it is desirable to modify the dispersions by the addition of other materials. These modifying agents may be blended with the polyamide polymer, dispersed in the dispersion medium, or dissolved in the dispersion medium. The modifying agents include dispersing agents, plasticizers, waxes, resins, pigments, and dyes. Suitable dispersing agents include lecithin, saponine, alkaline solutions of proteins such as casein and soybean protein, polyvinyl alcohol, and partially hydrolyzed polyvinyl acetate. Among the desirable plasticizers are the sulfonamides such as toluenesulfonamides, N-alkyltoluenesulfonamides, amylbenzenesulfonamides, and N-alkylbenzenesulfonamides. Other plasticizers are phenols such as resorcinol, tertiarybutylphenol, diamylphenol, 4-hydroxydiphenyl, 2-(bis-4-hydroxyphenyl)propane, esters such as diethyl phthalate and dibutyl phthalate, and ethers such as dimethoxytetraethylene glycol. Examples of waxes suitable for use as modifying agents are paraffin, carnauba, montan, beeswax, and hydrogenated castor oil. Pigments suitable for incorporation in the polyamide dispersions comprise zinc oxide, carbon black, lakes on inorganic substrates, azo pigments, ultramarine, chrome green, chrome yellow, molybdate orange, titanium dioxide, iron oxide, lithol red, lithopone, zinc sulfide, iron blue, phosphotungstic acid pigments, toluidine toner, tetraamino anthraquinones, the phthalocyanines such as copper phthalocyanine, and finely divided metals such as gold, silver, bronze, and aluminum. Mixtures of these pigments may also be used. Resins suitable for use in the polyamide dispersions include methacrylates such as methyl methacrylate and butyl methacrylate, phenol-formaldehyde resins, urea-formaldehyde resins, polyvinyl alcohol, polyvinyl acetate, partially hydrolyzed polyvinyl acetate, styrene polymers and interpolymers, neoprene, rosin, polyhydric alcohol-polybasic acid resins, ethylene-sulfur dioxide resins, cellulose ethers and esters, and polymeric hydrocarbons such as rubber, gutta percha, ethylene and butylene polymers. Dyes C. I. No. 365, 234, 653, 225, 176, 419, 370, 431, 583, 589, 594, 593, 267, 833, 307, 289, and 430 are suitable for use in the polyamide dispersions.

In general the modifying agents can be added at any of a number of stages during the preparation of the dispersion. They may be added to the massive polymer to be dispersed before it is dissolved in the solvent; they may be added to the polyamide solution used for the preparation of the dispersion; they may be placed in the non-solvent before it is mixed with the polyamide solution; they may be added to the finely divided polymer prior to dispersing it in the dispersion medium; they may be added to the dispersion medium either prior to or during the dispersing process; or they may be added to the finished dispersion. The properties of the modifying agent, particularly its solubility in the solvent, non-solvent and dispersion medium, will determine by which of these methods it can best be introduced. The physical properties of the modifying agent, as well as the method of introduction, determine the form of the agent in the dispersion. It may be blended with the polyamide particles, dispersed in the dispersion medium, or dissolved in the dispersion medium.

The dispersions described herein are adapted for coating a wide variety of materials such as cloth, paper, leather, rubber, wood, wallboard and ceramic ware. The dispersions can also be used to coat films cast from an aqueous alkaline cellulosic solution, such for example as cellulosic films regenerated from viscose. If the dispersion contains a plasticizer, a continuous coat can be obtained at the softening temperature of the plasticized composition. Cloth coated with polyamide is characterized by great strength, good pliability and other valuable properties which makes it useful as a leather substitute. Paper coated with polyamides is very resistant to both grease and water. The impregnated sheets can be laminated by pressing to give products useful as cardboard or wallboard. Polyamide coated leather has the appearance of patent leather. Polyamide dispersions, which may be dyed or pigmented, produce attractive glossy finishes on wood and render it resistant to decay. Wallboard, coated with polyamide and embossed, is an attractive substitute for wall tile. A smooth glaze may be applied to ceramic materials with polyamide dispersions. Woven or felted fabrics can be impregnated with polyamide dispersions. Such impregnated fabrics can be used for box toes and counters.

Another valuable application of the present polyamide dispersions is their addition to solutions of cellulose derivatives to be used for casting films or spinning fibers. The films or fibers obtained from these solutions contain finely divided embedded polyamide particles which because of their great affinity for dyes impart improved dyeing properties to the finished article. Such embedded particles also tend to deluster the product. In order that the polyamides be useful for these purposes they must be in the very finely divided state in which they are present in the compositions claimed herein. The polyamide dispersions when used for delustering fibers may contain a dissolved or suspended adhesive. If desirable, the fiber may be baked after the dispersion has been applied in order to make the particles adhere.

The present invention makes possible the manufacture of a large number of coated and impregnated products which are otherwise difficultly obtained. The dispersions are particularly valuable in the treatment of fabric and other materials affected by the acidic solvents which are used in polyamide solutions. When it is desired to restrict the treatment essentially to coating, the present invention is advantageous in that the dispersions, unlike the polyamide solutions, do not tend to strike through and make the fabric stiff. The dispersions are, furthermore, free from the tendency to gel and for this reason are less difficult to handle than the solutions.

The present invention is valuable also in connection with the coating of wire, metal sheeting and metal articles in general since metal coating is usually difficult to do by other methods. No solvent for the high melting polymers is available which is nontoxic and nonacidic. Furthermore, articles coated from solution frequently remain tacky for long periods of time after they are baked. Articles of any shape and size can be coated with a polyamide dispersion by spraying, painting or dipping. The coated article is then subjected to a short baking treatment either with or without exclusion of air. The polyamide coat applied in this way is surprisingly durable. Coated metal sheeting can be deep die drawn without breaking or loosening the polyamide film. Such adherent coating is of particular advantage where it is desirable to fabricate articles from metal sheeting which has previously been coated. Such articles include propeller blades and air screws for air blowers, embossed metal sheeting for wall covering and cartridge and blasting cap shells.

A valuable property of the dispersions of this invention is that they show surprisingly little change in viscosity with change in temperature or on aging. This is in marked contrast with polyamide solutions which exhibit very large variations in viscosity with change in temperature and which tend to gel on long standing. This difference may be due in part to the fact that the dispersing medium in contrast to many solvents does not have a degrading effect on the polyamide. The dispersions are stable, i. e. do not break down, regardless of whether they are made from a polyamide prepared with or without the use of a viscosity stabilizing agent. For a given concentration the dispersions have considerably higher viscosities than the solutions. Thus a dispersion containing 10% polyamide in water is very viscous whereas a 10% solution of the same polyamide in phenol is comparatively fluid. A further surprising fact is that these viscous polyamide dispersions can be satisfactorily sprayed. As previously indicated, however, their viscosities can be lowered by the addition of a dispersing agent.

As many apparently widely different embodiments of this invention may be made without departing from the spirit and scope thereof, it is to be understood that I do not limit myself to the specific embodiments thereof as defined in the appended claims.

I claim:

1. A process for preparing a coating composition comprising a dispersion in particle size not larger than 4 microns of a synthetic linear polymeric amide, said process comprising adding with vigorous stirring a solution of said polymeric amide to a large volume of a non-solvent therefor, and then redispersing the precipitated polymeric amide obtained in a non-solvent for the polymeric amide by vigorous mechanical dispersion means which separates the agglomerates of the polymeric amide particles, said polymeric amide being the reaction product of a linear polymer-forming composition comprising reacting material selected from the class consisting of (a) a mixture of diamine and dibasic carboxylic acid, and (b) a monoaminomonocarboxylic acid.

2. The process set forth in claim 1 in which said polymeric amide is polyhexamethylene adipamide.

3. The process set forth in claim 1 in which said non-solvent is water.

WILLARD E. CATLIN.